United States Patent
Liu et al.

(10) Patent No.: US 7,206,556 B1
(45) Date of Patent: Apr. 17, 2007

(54) WIRELESS TRANSMITTER CONTROL LOCKOUT

(75) Inventors: Edward W. Liu, Milpitas, CA (US); Bruce R. Intihar, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 510 days.

(21) Appl. No.: 10/637,295

(22) Filed: Aug. 8, 2003

(51) Int. Cl.
*H04B 17/00* (2006.01)
*H04Q 7/22* (2006.01)

(52) U.S. Cl. ............................... 455/115.1; 455/414.1; 455/420

(58) Field of Classification Search ............. 455/115.1, 455/115.3, 115.4, 127.1, 127.4, 269, 403, 455/418, 420, 456.5, 456.6, 13.4, 39, 500, 455/522
See application file for complete search history.

(56) References Cited

U.S. PATENT DOCUMENTS

| | | | |
|---|---|---|---|
| 5,991,279 A * | 11/1999 | Haugli et al. ............... | 370/311 |
| 6,636,790 B1 * | 10/2003 | Lightner et al. ............ | 701/33 |
| 6,711,384 B2 * | 3/2004 | Kubo et al. .................. | 455/68 |
| 6,801,755 B2 * | 10/2004 | Kardach et al. ............ | 455/41.2 |
| 2003/0129961 A1 * | 7/2003 | Weisshaar et al. .......... | 455/403 |
| 2003/0130001 A1 * | 7/2003 | Weisshaar et al. .......... | 455/510 |

OTHER PUBLICATIONS

Case, David A. "FCC Part 15.—Intentional Radiators: Updates, Public Notices, and Rule Changes," *Compliance Engineering*, Jan.-Feb. 2001 <http://www.ce-mag.com/archive/2001/janfeb/Case44.html>.
FCC 2000. "Part 15 Unlicensed Modular Transmitter Approval," FCC Public Notice DA 00-1407, 4 pages (Jun. 26, 2000).
JEDEC JC-61 Committee. 2002. "Technical Background White Paper," Technical White Paper v1.0c, 10 pages (Oct. 2002).

* cited by examiner

*Primary Examiner*—Tony T. Nguyen
(74) *Attorney, Agent, or Firm*—Patterson & Sheridan, LLP

(57) ABSTRACT

Modification of transmission control parameters is prevented during data transmission in a wireless transmitter. A lockout unit is used to prevent modification of the transmission control parameters during data transmission and allow modification of the transmission control parameters when data is not being transmitted. When the wireless transmitter is included in a computing system a software driver for the wireless transmitter does not need to include a software lockout mechanism. Furthermore, the wireless transmitter including the lockout unit may be tested as a standalone device, facilitating regulatory agency certification as a modular transmitter.

21 Claims, 4 Drawing Sheets

WIRELESS TRANSMITTER CONTROL LOCKOUT

FIELD OF THE INVENTION

One or more aspects of the invention generally relate to wireless transmitters.

BACKGROUND

Current wireless transmitters are exemplified by systems and methods developed to transmit data at least partially responsive to transmission control parameters. The transmission control parameters should not be modified during data transmission. Conventional wireless transmitters, included within a computing system, employ a software lockout mechanism within a software driver to prevent modification of the transmission control parameters during data transmission. Testing of the wireless transmitter during a regulatory agency certification process requires the software driver to verify that the transmission control parameters are not modified during data transmission, necessitating testing of at least a portion of the computing system including a host processor, software driver, and the wireless transmitter. It is desirable to complete the regulatory agency certification process testing the wireless transmitter as a modular transmitter, i.e., without other portions of the computing system. A certified modular transmitter may be included in computing systems without further certification of the modular transmitter.

For the foregoing reasons, it is desirable to prevent modification of the transmission control parameters used by a wireless transmitter during data transmission, permitting testing of the wireless transmitter as a modular transmitter.

SUMMARY

Various embodiments of the invention include a wireless transmitter for data transmission. The wireless transmitter includes a storage element and a lockout unit coupled to the storage element. The storage element is configured to store a transmission control parameter. The lockout unit is configured to prevent a modification of one or more transmission control parameters stored in the storage element during the data transmission.

Various embodiments of the invention include a computing system configured to transmit data using a wireless transmitter. The computing system includes a host processor, a host memory, the host memory storing at least one program for the host processor, and a system interface coupled to the host processor and a wireless transmitter. The wireless transmitter includes a storage element configured to store at least one transmission control parameter and a lockout unit coupled to the storage element. The lockout unit is configured to prevent a modification of the at least one transmission control parameter during data transmission.

Various embodiments of a method of the invention include a method of preventing modifications to at least one transmission control parameter in a wireless transmitter. Data is received for transmission and a lockout unit is configured to prevent modification of the at least one transmission control parameter.

Further various embodiments of a method of the invention include a method of enabling modifications of at least one transmission control parameter in a wireless transmitter following a data transmission. The data transmission ending is detected and a lockout unit is configured to enable modification of the at least one transmission control parameter.

BRIEF DESCRIPTION OF THE VARIOUS VIEWS OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DISCLOSURE OF THE INVENTION

Figure 1:
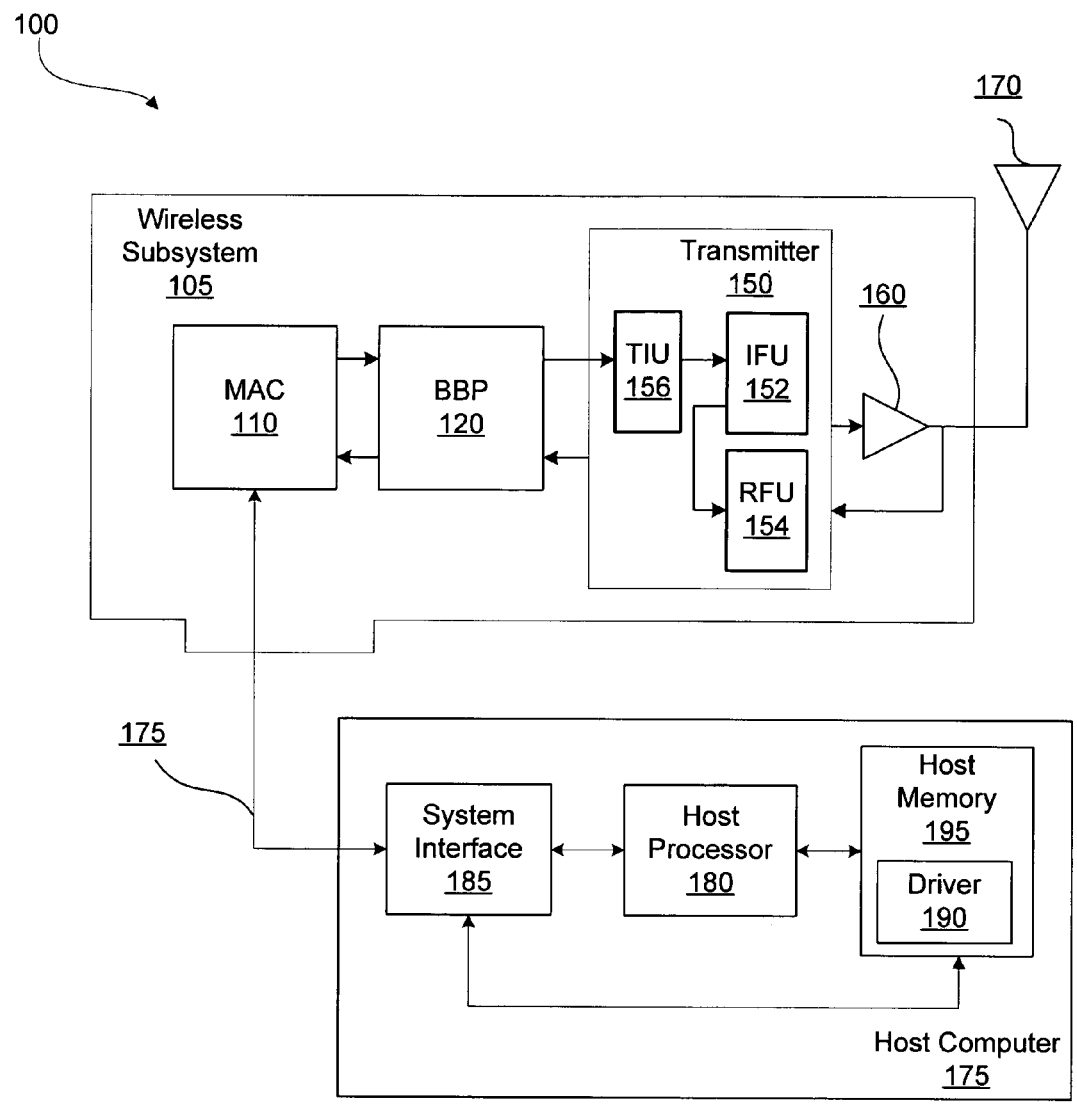
FIG. 1 is a block diagram of an exemplary embodiment of a respective computer system in accordance with one or more aspects of the present invention including a host computer and a wireless subsystem.

The current invention involves new systems and methods for controlling the modification of at least one transmission parameter in a wireless transmitter. FIG. 1 is a block diagram of an exemplary embodiment of a respective computer system, Computing System 100 in accordance with one or more aspects of the present invention including a Host Computer 175 coupled to a Wireless Subsystem 105 via Interface 175. Computing System 100 may be a desktop computer, server, laptop computer, palm-sized computer, tablet computer, game console, cellular telephone, computer based simulator, or the like. Host Computer 175 includes a Host Processor 180 that may include a system memory controller to interface directly to a Host Memory 195 or may communicate with Host Memory 195 through a System Interface 185. System Interface 185 may be an I/O (input/output) interface or a bridge device including the system memory controller to interface directly to Host Memory 195. Examples of System Interface 185 known in the art include Intel® Northbridge and Intel® Southbridge.

In this embodiment Wireless Subsystem 105 is a plug-in card such as a PCI (Peripheral Component Interface) card, a daughter card, or the like. Interface 175 is an industry standard interface such as PCI, a proprietary interface, or the like. In an alternate embodiment Wireless Subsystem 105 is integrated onto a substrate including System Interface 185 and Interface 175 is a local interconnect. Host Memory 195 includes a Driver 190 which translates commands from a software program or an application executing on Host Processor 180 into commands for Wireless Subsystem 105. Conventionally, each embodiment of Wireless Subsystem 105 is associated with a specific Driver 190.

Wireless Subsystem 105 includes a MAC (Media Access Control) 110 and BBP (Baseband Processor) 120, each familiar to those skilled in the art. BBP 120 is coupled to a Transmitter 150. In an alternate embodiment Transmitter 150 is replaced with a transceiver. Transmitter 150 includes TIU (Transmit Interface Unit) 156, IFU (Intermediate Frequency Unit) 152, and RFU (Radio Frequency Unit) 154.

The output of Transmitter 150 is coupled to Amplifier 160 which is coupled to Antenna 170. Transmitter 150 may include additional units to receive and transmit data from BBP 120 to Amplifier 160 or from Antenna 170 to BBP 120. Likewise, Transmitter 150 may include TIU 156 and either IFU 152 or RFU 154. Conventionally, Antenna 170 is positioned at a distance (as great as 50 cm) away from BBP 120 and MAC 110 to minimize electrical interference between those units and Antenna 170.

Wireless Subsystem 105 may be submitted for certification as a modular transmitter to a regulatory agency such as the FCC (Federal Communications Commission). The certification testing verifies that transmission control parameters, e.g., transmit output center frequency, transmit power level, and the like, used by Transmitter 150 are not be modified during data transmission. Conventionally, Driver 190 is designed to prevent the transmission control parameters from being modified during data transmission. However, contrary to that approach, in this design TIU 156 within Transmitter 150 prevents the transmission control parameters from being modified during data transmission, as described further herein, enabling Wireless Subsystem 105 to be submitted for certification as a standalone (modular) transmitter independent of Host Computer 175. Furthermore, Wireless Subsystem 105 will operate properly whether or not Driver 190 is designed to prevent the transmission control parameters from being modified during data transmission. Therefore, Wireless Subsystem 105 may be used with a conventional driver or with a specific driver that is not designed to prevent the transmission control parameters from being modified during data transmission.

Figure 2:
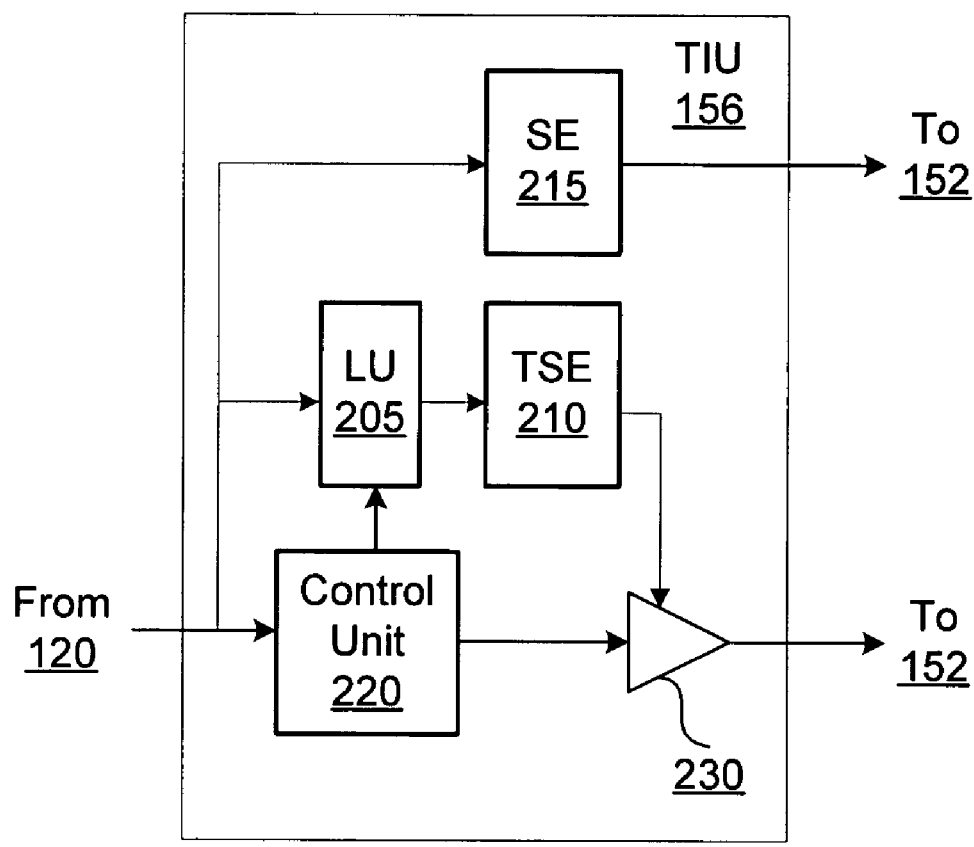
FIG. 2 is a block diagram of an exemplary embodiment of portions of the transmitter of FIG. 1 in accordance with one or more aspects of the present invention.

FIG. 2 is a block diagram of an exemplary embodiment of portions of TIU 156 of FIG. 1 in accordance with one or more aspects of the present invention. TIU 156 includes a Control Unit 220, LU (Lockout Unit) 205, TSE (Transmit Storage Element) 210, SE (Storage Element) 215, and Amplifier 230. Control Unit 220 receives transmission control data from BBP 120, such as commands to modify the transmission control parameters. LU 205 receives the commands to modify the transmission control parameters and is configured by Control Unit 220 to pass the commands to TSE 210 or to block the commands from entering TSE 210, thereby either preventing or allowing modification of the transmission control parameters stored in TSE 210. TSE 210 includes one or more storage elements such as registers or the like, for storing transmission control parameters. In an alternate embodiment LU 205 is configured by Control 220 to pass or block a portion of the commands received from BBP 120. For example, LU 205 is configured to block commands to modify the transmit power level. SE 215 includes one or more storage elements for storing control parameters that may be modified during data transmission.

Control Unit 220 also receives data for transmission from BBP 120 which is output to Amplifier 230. Amplifier 230 also receives one or more transmission control parameters, e.g., transmit output center frequency, transmit power level, and the like, from TSE 210 and produces optionally modified data for transmission. Amplifier 230 outputs the optionally modified data for transmission to IFU 152 or RFU 154. In an alternate embodiment Amplifier 230 outputs the optionally modified data for transmission to another unit. SE 215 outputs one or more control parameters to IFU 152 or RFU 154.

Figure 3A:
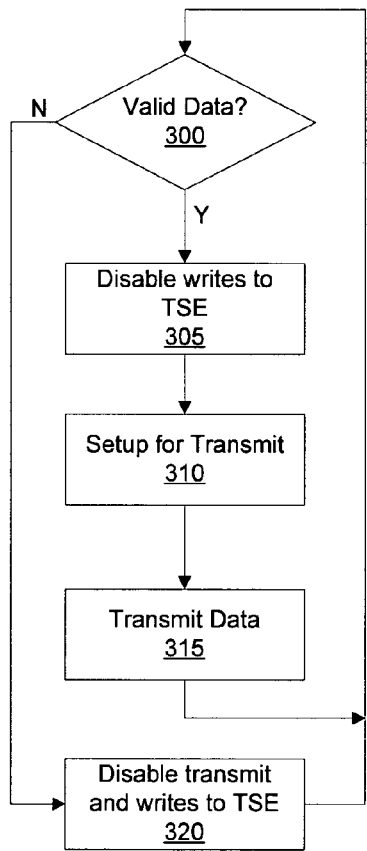
FIGS. 3A and 3B illustrate embodiments of methods in accordance with one or more aspects of the present invention.

FIG. 3A illustrates an embodiment of a method for enabling and disabling modifications of the transmission control parameters in accordance with one or more aspects of the present invention. In step 300 Control Unit 220 determines if the data received for transmission from BBP 220 is valid. For example a signal (data valid) may be received indicating whether or not transmitted data is valid for each clock cycle. If, in step 300 Control Unit 220 determines the data received for transmission is valid, in step 305 Control Unit 220 activates LU 205, i.e., configures LU 205 to block commands to modify one or more transmission control parameters stored in TSE 210.

In step 310 Transmitter 150 is setup for data transmission. Transmitter 150 is setup for transmission by enabling a power sequencer which turns on the transmitter subblocks. In step 315 Control Unit 220 passes data for transmission from BBP 120 to Amplifier 230. Amplifier 230 outputs the data for transmission to one or more units within Transmitter 150, such as IFU 152 and RFU 154. Steps 300, 305, 310, and 315 are repeated whenever valid data is received.

If, in step 300 Control Unit 220 determines the data received for transmission from BBP 220 is not valid, in step 320 data transmission is disabled and Control Unit 220 deactivates LU 205, i.e., configures LU 205 to pass commands to modify one or more transmission control parameters stored in TSE 210. Steps 300 and 320 are repeated whenever data is received that is not valid.

Figure 3B:
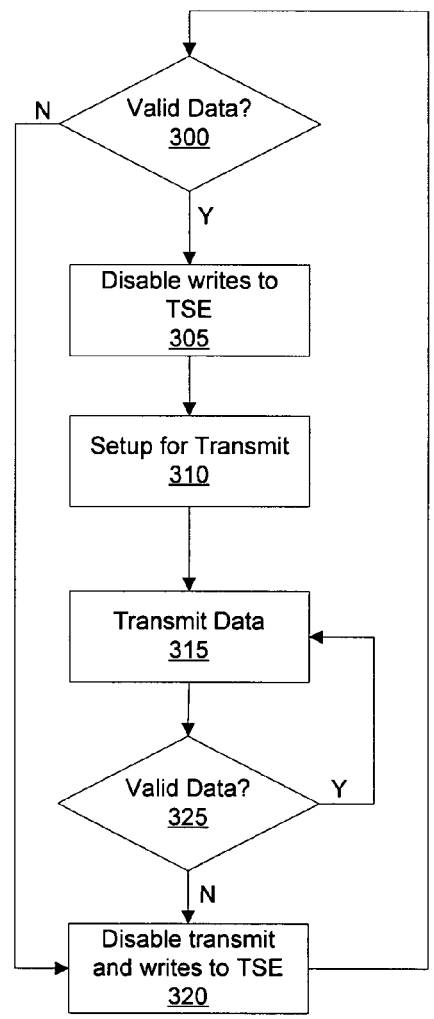

FIG. 3B illustrates an embodiment of a method or enabling and disabling modifications of the transmission control parameters in accordance with one or more aspects of the present invention including the steps shown in FIG. 3A. In this embodiment steps 305 and 310 are not repeated when a continuous stream of valid data is received by TIU 156 for transmission. Specifically, after completing step 310, in step 325 Control Unit 220 determines if data received for transmission from BBP 220 is valid, and, if so, step 315 is repeated. If, in step 325 Control Unit 220 determines data received for transmission from BBP 220 is not valid, in step 320 data transmission is disabled and Control Unit 220 deactivates LU 205, i.e., configures LU 205 to pass commands to modify one or more transmission control parameters stored in TSE 210.

Figure 4:
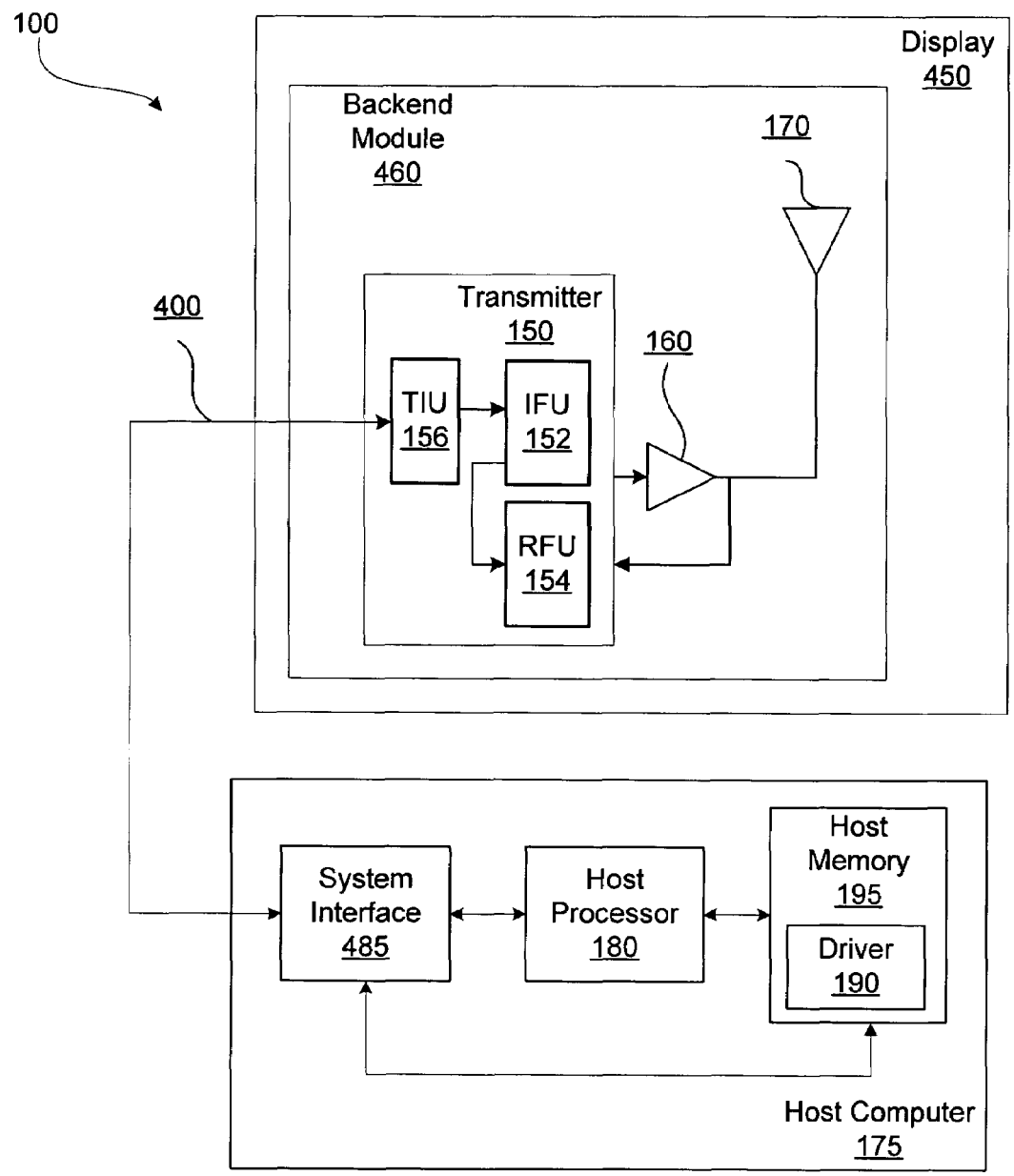
FIG. 4 is a block diagram of an exemplary embodiment of a respective computer system in accordance with one or more aspects of the present invention including a host computer and a wireless subsystem.

FIG. 4 is a block diagram of an exemplary embodiment of Computing System 100 in accordance with one or more aspects of the present invention. In this embodiment of Computing System 100 MAC 110 and BBP 120 (not shown) may each be included within Host Computer 175 as discrete components, integrated within System Interface 485, included on a daughter card interfacing with System Interface 485, or the like. Furthermore, MAC 110 and BBP 120 may each be embodied as one or more software programs, e.g. Soft Wi-Fi, stored in Host Memory 195 and executed by Host Processor 180.

An Interface 400 may be a digital interface such as a JEDEC JC-61 compliant interface, a proprietary interface, or the like. In this embodiment of Computing System 100, Transmitter 150 (including IFU 152, RFU 154, and TIU 156), Amplifier 160, and Antenna 170 are included in a Backend Module 460 located within a Display 450, such as a display on a laptop, portable computing device, or the like. Locating Transmitter 150, Amplifier 160, and Antenna 170 away from Host Computer 175 reduces the effects of electrical interference introduced by units within Host Computer 175. In an alternate embodiment Backend Module 460 may be located in another area within Computing System 100.

Backend Module 460 is configured for submission to a regulatory agency for certification as a modular transmitter (stand-alone radio module), for example under FCC rule DA 00-1407. Once certified, Backend Module 460 may be integrated into a variety of Computing System 100 without further certification of Backend Module 460. Furthermore, Backend Module 460 may be integrated into a Computing System 100 including either a Driver 190 which prevents modification of the transmission parameters during data transmission or with a Driver 190 which does not prevent modification of the transmission parameters during data transmission.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim. Within the claims, element lettering (e.g., "a)", "b)", "i)", "ii)", etc.) does not indicate any specific order for carrying out steps or other operations; the lettering is included to simplify referring to those elements.

The invention claimed is:

1. A modular wireless transmitter for data transmission that is further configured to operate independently of commands from a host computer, comprising:
    a storage element, the storage element configured to store a transmission control parameter; and
    a lockout unit coupled to the storage element, the lockout unit configurable to prevent a modification of the transmission control parameter stored in the storage element during the data transmission and to allow modification of the parameter following the data transmission, whereby the transmitter may be submitted for certification as a modular transmitter independent of the host computer.

2. The wireless transmitter of claim 1, further comprising: a control unit configured to activate the lockout unit.

3. The wireless transmitter of claim 1, further comprising: a control unit configured to deactivate the lockout unit.

4. The wireless transmitter of claim 2, wherein the control unit activates the lockout unit when data is received for transmission.

5. The wireless transmitter of claim 3, wherein the control unit deactivates the lockout unit when data is not received for transmission.

6. The wireless transmitter of claim 1, wherein the storage element comprises a register configured to store one or more bits of data for each transmission control parameter.

7. A system configured to transmit data using a modular wireless transmitter configurable for operation independent of commands from a host computer, comprising:
    a host processor;
    a host memory, the host memory storing at least one program for the host processor;
    a system interface coupled to the host processor and a wireless transmitter; and the wireless transmitter including
        a storage element configured to store at least one transmission control parameter; and
        a lockout unit coupled to the storage element, the lockout unit configured to prevent a modification of the at least one transmission control parameter during data transmission and to allow modification of the parameter following the data transmission, whereby the transmitter may be submitted for certification as a modular transmitter independent of the host computer.

8. The computing system of claim 7, wherein the host processor, host memory, and system interface are contained within a first subsystem.

9. The computing system of claim 8, wherein the wireless transmitter is contained within the first subsystem.

10. The computing system of claim 8, wherein the wireless transmitter is contained within a second subsystem coupled to the first subsystem via an interface.

11. The computing system of claim 10, wherein the interface is digital.

12. The computing system of claim 10, wherein the second subsystem includes an antenna.

13. The computing system of claim 10, wherein the second subsystem is located in a display device.

14. The computing system of claim 10, wherein the second subsystem is configured for submission to a regulatory agency for certification as a modular transmitter.

15. The computing system of claim 7, wherein the host memory stores a driver configured to communicate at least one transmission control parameter between the program and the wireless transmitter.

16. The computing system of claim 15, wherein the driver does not prevent communication of a transmission control parameter to the wireless transmitter during data transmission.

17. The computing system of claim 15, wherein the driver prevents communication of a transmission control parameter to the wireless transmitter during data transmission.

18. A method of preventing modifications to at least one transmission control parameter in a modular wireless transmitter during data transmission and to allow modification of the parameter following the data transmission independent of commands from a host computer, comprising:
    receiving data for transmission; and
    configuring a lockout unit in the modular wireless transmitter to prevent modification of the at least one transmission control parameter during the transmission of the data.

19. The method of claim 18, further comprising:
    detecting data transmission has ended; and
    configuring the lockout unit to enable modification of the at least one transmission control parameter.

20. A method of enabling modifications of at least one transmission control parameter in a modular wireless transmitter following a data transmission during the data transmission and to allow modification of the parameter following the data transmission, whereby the transmitter may be submitted for certification as a modular transmitter independent of a host computer, comprising:
    detecting the data transmission has ended; and
    configuring a lockout unit incorporated in the modular wireless transmitter to enable modification of the at least one transmission control parameter.

21. The method of claim 20, further comprising:
    receiving data for transmission; and
    configuring the lockout unit to prevent modification of the at least one transmission control parameter.

* * * * *

UNITED STATES PATENT AND TRADEMARK OFFICE
CERTIFICATE OF CORRECTION

| | | |
|---|---|---|
| PATENT NO. | : 7,206,556 B1 | Page 1 of 1 |
| APPLICATION NO. | : 10/637295 | |
| DATED | : April 17, 2007 | |
| INVENTOR(S) | : Liu et al. | |

It is certified that error appears in the above-identified patent and that said Letters Patent is hereby corrected as shown below:

On the title page, item 73, replace "Nvidia", with --NVIDIA--

Signed and Sealed this

Seventh Day of October, 2008

JON W. DUDAS
*Director of the United States Patent and Trademark Office*